United States Patent
Dallan

(10) Patent No.: US 10,016,842 B2
(45) Date of Patent: Jul. 10, 2018

(54) METHOD FOR CARRYING OUT PRECISE LASER CUTTINGS ON A RIBBON SHEET AND APPARATUS TO CARRY OUT THE METHOD

(71) Applicant: Dallan S.p.A., Castelfranco Veneto (IT)

(72) Inventor: Andrea Dallan, Castelfranco Veneto (IT)

(*) Notice: Subject to any disclaimer, the term of this patent is extended or adjusted under 35 U.S.C. 154(b) by 0 days.

(21) Appl. No.: 15/566,713

(22) PCT Filed: Jun. 16, 2016

(86) PCT No.: PCT/IB2016/053571
§ 371 (c)(1),
(2) Date: Oct. 15, 2017

(87) PCT Pub. No.: WO2016/203419
PCT Pub. Date: Dec. 22, 2016

(65) Prior Publication Data
US 2018/0126486 A1    May 10, 2018

(30) Foreign Application Priority Data
Jun. 18, 2015   (IT) .................. UB2015A001510

(51) Int. Cl.
  B23K 26/16    (2006.01)
  B23K 26/08    (2014.01)
  B23K 26/03    (2006.01)
  B23K 26/38    (2014.01)

(52) U.S. Cl.
  CPC ........ *B23K 26/032* (2013.01); *B23K 26/0876* (2013.01); *B23K 26/38* (2013.01)

(58) Field of Classification Search
  CPC ...... B23K 26/02; B23K 26/03; B23K 26/032; B23K 26/0344; B23K 26/035; B23K 26/08; B23K 26/082; B23K 26/083–26/0853; B23K 26/0869; B23K 26/0876
  USPC .......................................... 219/121.6–121.83
  See application file for complete search history.

(56) References Cited

U.S. PATENT DOCUMENTS

| | | | | |
|---|---|---|---|---|
| 3,764,772 A | * | 10/1973 | Matuschek | B23K 1/0053 219/85.12 |
| 5,614,115 A | * | 3/1997 | Horton | B23K 26/0846 219/121.67 |
| 6,619,168 B2 | * | 9/2003 | Alsten | B26D 5/00 347/157 |

(Continued)

FOREIGN PATENT DOCUMENTS

| | | |
|---|---|---|
| DE | 102013203384 | 8/2014 |
| GB | 2458986 | 10/2009 |

*Primary Examiner* — Sang Y Paik
(74) *Attorney, Agent, or Firm* — Themis Law

(57) ABSTRACT

An method and apparatus for carrying out precise laser cutting on a ribbon sheet positioned in a laser cutting station includes providing a laser cutting station that comprises a conveyor for advancing the ribbon sheet, a cutting head movable along both a longitudinal and a transverse axis in relation to the station, a vision system also movable along the same axes, and a command and control center with associated software that commands the movements of the cutting head and of the vision system, wherein the command and control center is provided with the coordinates of a CAD/CAM drawing corresponding to the ribbon sheet to be processed.

1 Claim, 1 Drawing Sheet

(56) References Cited

U.S. PATENT DOCUMENTS

2009/0312858 A1 12/2009 Alpay
2013/0049265 A1 2/2013 Kieburg

* cited by examiner

METHOD FOR CARRYING OUT PRECISE LASER CUTTINGS ON A RIBBON SHEET AND APPARATUS TO CARRY OUT THE METHOD

The present invention relates to a method for carrying out precise laser cutting on a ribbon sheet, and apparatus for carrying out the method.

In known coil processing methods, the ribbon is unwound from a reel, made to pass through a straightening roller unit, and cut to form a sheet which is subjected to laser cutting operations to obtain the finished piece.

This method is however of poor precision reliability in that, because of the geometrical characteristics and intrinsic tolerances of the coil and of its unpredictable position in the machine, such as cambering, curving or dishing, it cannot always be ensured that the laser cutting operation corresponds precisely to the position/dimension of the ribbon and/or of any pre-existing processing/perforations thereon.

The object of the invention is to eliminate these drawbacks by verifying the positioning of the sheet/ribbon resting on the conveyor belt inside the cutting station, relative to its ideal position for which the cutting operations have been programmed, such as to carry out these programmed operations taking account of any displacements of the sheet/ribbon and/or of the precise position of any pre-existing processing.

This object is attained according to the invention by a method as described in claim 1.

Figure 1:
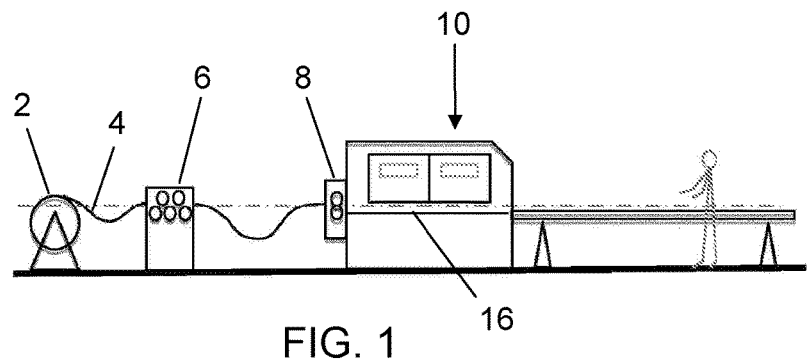
Figure 2:
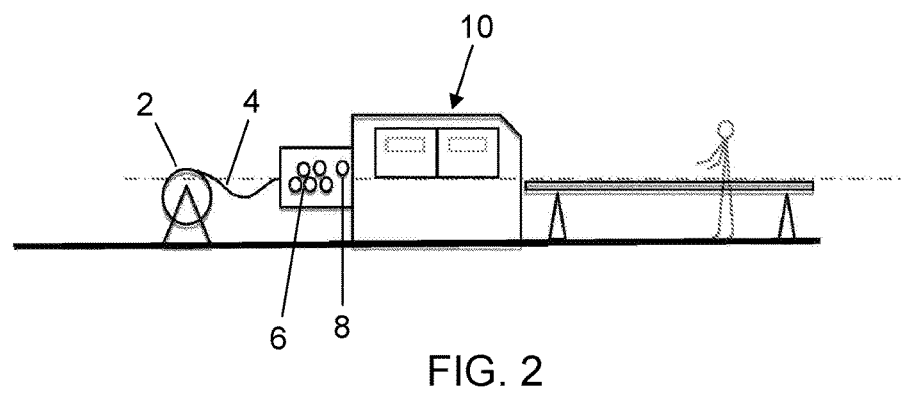
Figure 3:
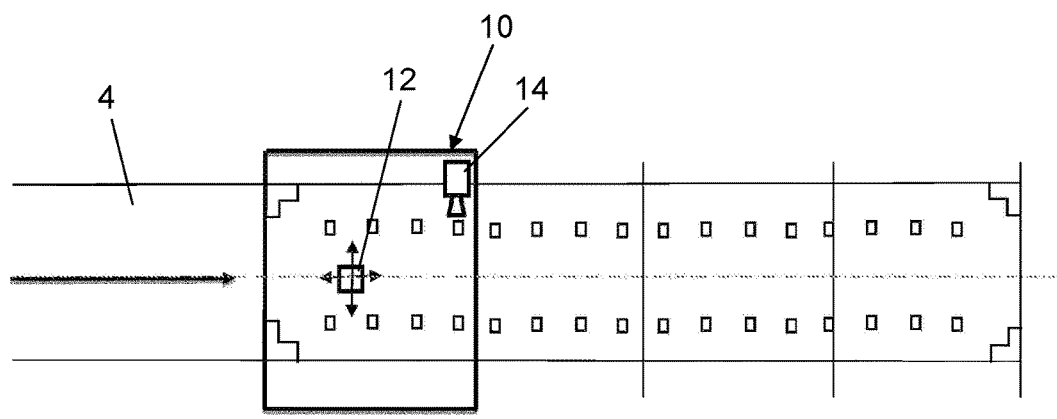

The present invention is further clarified hereinafter with reference to the accompanying drawings, in which:

FIG. 1 is a lateral schematic view of an apparatus for implementing the method according to the invention, FIG. 2 shows a second embodiment thereof, FIG. 3 is a plan view showing the sequence of operations carried out within the cutting area of the laser head.

As can be seen from the figures, the method according to the invention uses an apparatus shown in FIG. 1, which comprises a reel 2 for feeding a coil ribbon 4 to a straightening roller unit 6 and then to a feeder 8 which feeds a laser cutting station 10.

The cutting station 10 houses a cutting head 12 which is movable, in accordance with a traditional Cartesian movement system, both along the axis longitudinal to the station (X axis) and along the axis transverse to the station (Y axis). A vision system 14 is mounted in the station.

In a modified embodiment, not shown in the drawings, the vision system 14 and the cutting head 12 are mutually rigid.

A software programme is associated with the vision system 14 to cause the cutting head 12 to move within the station 10 by means of a command and control centre (not shown in the drawings).

A conveyor belt 16 is provided in the station 10 for advancing the ribbon, for example of fakir bed type.

The apparatus according to the invention operates in the following manner: the command and control centre receives the coordinates of a CAD/CAM drawing showing the ribbon sheet to be processed, of length Lu and width Le. In the ensuing description, the front edge is that closest to the cutting station exit.

The vision system 14 is then positioned in a position corresponding with the exit end of the cutting station 10. The coil ribbon 4 leaving the reel 2 is made to pass through the straightening roller unit 6 and is then fed to the cutting station 10 in which the ribbon advances until the vision system 14 identifies the front edge of the ribbon. The command and control centre then halts the conveyor 16 and the vision system 14 provides the centre with the coordinates X1,Y1, in the machine Cartesian reference system, of a point on this front edge. With the ribbon sheet still at rest, the vision system 14 is positioned in a position corresponding with a ribbon longitudinal edge to determine thereon two points of coordinates, X2,Y2 and X3,Y3 respectively, in the machine Cartesian reference system, this data also being provided to the command and control centre.

On the basis of the data received, the command and control centre determines, within the space of the machine Cartesian reference system, the coordinates at which to set the zero point of the CAD/CAM drawing and the angulation at which to locate these axes such that the ribbon sheet represented in the drawings has its longitudinal edges coinciding with the longitudinal edges of the ribbon sheet, and has its front edge coinciding with the front edge of the sheet.

In particular, the coordinates X2Y2;X3Y3 of the longitudinal edge are used to determine the coil angle of inclination and hence the inclination to be applied to the product to be produced. Knowing this angle and the coordinates X1,Y1 (front edge), the command and control centre also determines the equation of the straight line on which the front edge of the coil lies, and causes the edge of the CAD/CAM drawing showing the ribbon sheet to correspond to this.

The command and control centre, knowing the dimensions Lu and Le of the sheet, uniquely calculates at which coordinates of the machine reference system to locate the position of the zero point of the CAD/CAM drawing such that it becomes perfectly reproduced on the ribbon sheet.

In a modified embodiment, the method causes the command and control centre to be provided with the drawing of the ribbon sheet to be processed, and with the absolute position of a reference hole and of two points on a longitudinal edge.

In a further embodiment, the method causes the command and control centre to be provided with the drawing of a ribbon sheet provided with two reference holes. In this manner, the vision system compares the absolute position of these two holes with the CAD/CAM dimensions shown therein.

In a further embodiment, the method causes the command and control centre to be provided with the drawing of the ribbon sheet to be processed, with the position of initiation of two vertically aligned continuous perforation schemes, and with a longitudinal edge. In this embodiment, the method determines the X,Y coordinates of two perforation schemes, to obtain the X,Y dimensions, in the machine reference system, of two micro-perforation portions knowing, as initial assumption, that they are perfectly disposed on the vertical. By means of the aforesaid determined dimensions, the angle of inclination of the material present can be determined (which is therefore also the product production angle), which inclination, together with the X,Y determination of a point on a longitudinal edge, enables the point O of the CAD/CAM drawing to be uniquely identified, such that it perfectly fits onto the ribbon sheet and onto the existing perforation.

The invention claimed is:

1. A method for carrying out precise laser cutting on a ribbon sheet (4) of length Lu and width Le positioned in a laser cutting station (10), comprising:

providing a conveyor (16) that advances the ribbon sheet;

providing a cutting station (10) with a cutting head (12) movable by a system for Cartesian movement along both an axis longitudinal to the cutting station (X axis) and along an axis transverse to the laser cutting station (Y axis);

providing a vision system (14) mutually rigid with the cutting head (12), the vision system being also movable along the X axis and Y axis; and providing a command and control center operating a software which commands a movement of the cutting head (12) and of the vision system (14), wherein:

the command and control center is provided with coordinates of a CAD/CAM drawing corresponding to the ribbon sheet to be processed, a reference hole being provided on said drawing, the ribbon sheet (4) of length Lu and width Le is fed to an interior of the cutting station, the conveyor (16) is halted and the vision system provides the command and control centre with coordinates X1,Y1, in a machine reference system, of a previously determined reference hole, while maintaining the ribbon sheet at rest, the command and control center moves the vision system into a position corresponding with two points on a longitudinal edge of the ribbon sheet, to identify two points X2Y2 and X3Y3, in a machine Cartesian reference system, which are transmitted to the command and control center, based on data received by the command and control center, and of the software associated therewith, the command and control center determines, within a space of the machine Cartesian reference system, at which coordinates to locate a point O where the Cartesian axes in the CAD/CAM drawing meet, and at which angular position to locate said Cartesian axes such that the ribbon sheet represented in the CAD/CAM drawing has a longitudinal edge coinciding with the longitudinal edge of the viewed ribbon sheet and has the viewed hole coinciding with a same hole indicated in the CAD/CAM drawing, the cutting system is provided with a value of the coordinates such that said cutting station operates taking into account a difference between obtained values obtained and ideal values, and a point on a front edge of the ribbon sheet is used as reference point;

further comprising:

providing the command and control center with the coordinates of a CAD/CAM drawing corresponding to the ribbon sheet to be processed, such as to create a machine Cartesian reference system;

positioning the vision system in a position corresponding to an exit end of the cutting station;

introducing the ribbon sheet of length Lu and width Le or a ribbon of width Le into the cutting station until the vision system identifies the front edge of the ribbon sheet; and halting the conveyor and providing the command and control center with the coordinates X1,Y1, in the machine reference system, of a point of the front edge of the ribbon sheet, wherein, while maintaining the ribbon sheet at rest, the command and control center moves the vision system into a position corresponding with two points on a longitudinal edge of the sheet, to identify two points X2Y2 and X3Y3, in the machine Cartesian reference system, which are provided to the command and control center, wherein, based on the data received by the command and control center, and of the software associated therewith, the command and control center determines, within the space of the Cartesian reference system, at which coordinates to locate the point O, a meeting point of the Cartesian axes, and at which angular position to locate the Cartesian axes such that the ribbon sheet represented in the drawing has the longitudinal edge coinciding with the longitudinal edge of the ribbon sheet and the front edge coinciding with the front edge of the sheet, and wherein the command and control centre provides the cutting station with a value of the coordinates to locate the point O, such that said system operates while taking account of the difference between the obtained values and the ideal values.

* * * * *